United States Patent
Clift et al.

(10) Patent No.: US 11,895,345 B2
(45) Date of Patent: Feb. 6, 2024

(54) OBFUSCATING REPLACEABLE CONTENT IN ADVANCED TELEVISION SYSTEMS COMMITTEE (ATSC) 3.0 SYSTEM

(71) Applicant: Sony Group Corporation, Tokyo (JP)

(72) Inventors: Graham Clift, San Diego, CA (US); Luke Fay, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/935,076

(22) Filed: Sep. 23, 2022

(65) Prior Publication Data
US 2023/0412858 A1   Dec. 21, 2023

Related U.S. Application Data

(60) Provisional application No. 63/366,527, filed on Jun. 16, 2022.

(51) Int. Cl.
*H04L 41/0823* (2022.01)
*H04N 21/2343* (2011.01)
*H04N 21/234* (2011.01)
*H04N 21/845* (2011.01)

(52) U.S. Cl.
CPC . *H04N 21/23439* (2013.01); *H04N 21/23424* (2013.01); *H04N 21/8456* (2013.01)

(58) Field of Classification Search
CPC ......... H04N 21/23424; H04N 21/8456; H04N 21/6125; H04L 65/75
See application file for complete search history.

(56) References Cited

U.S. PATENT DOCUMENTS

| 10,878,076 B2 | 12/2020 | Yamagishi |
| 11,368,766 B2 | 6/2022 | Zhao et al. |
| 2017/0034576 A1 | 2/2017 | Eyer |
| 2020/0228851 A1* | 7/2020 | Santos ............... H04N 21/6125 |

OTHER PUBLICATIONS

ETSI TS 126 247 V10.5.0 (Sep. 2013), Technical Specification, Progressive Download and Dynamic Adaptive Streaming over http (3GP-DASH) (3GPP TS 26.247 version 10.5.0 Release 10) (Year: 2013).*
ATSC Candidate Standard: Revision of A/344:2021, ATSC 3.0 Interactive Content, Nov. 24, 2021, pp. 1-189, Advanced Television Systems Committee (Year: 2021).*
2Ad Insertion in Live Content, Zachary Cava, Video Platform Architect, Hulu; DVB Webinar—Mar. 2020, pp. 1-18, https://dashif.org/docs/CR-Ad-Insertion-r8.pdf. (Year: 2020).*
Xu et al., "DASH and MMT and Their Applications in ATSC 3.0", Shanghai Jiaotong University, Shanghai 200000, China, Feb. 15, 2016.
"Information Technology—Dynamic Adaptive Streaming Over http (DASH)—Part 1: Media presentation description and segment formats", Draft Text of ISO/IEC 23009-1 3rd edition, XP030269625, May 29, 2016.

* cited by examiner

*Primary Examiner* — Chirag R Patel
(74) *Attorney, Agent, or Firm* — John L. Rogitz; John M. Rogitz (57) ABSTRACT

Techniques are described for concealing aspects of RC in the Advanced Television Systems Committee (ATSC) 3.0 television protocol in robustly delivering the next generation broadcast television services. In this way, by delivering information needed to play the RC very shortly before insertion is to occur, skipping strategies can be foiled.

20 Claims, 4 Drawing Sheets

Overall Logic

FIG. 3

EAP-Based Logic

FIG. 4

OBFUSCATING REPLACEABLE CONTENT IN ADVANCED TELEVISION SYSTEMS COMMITTEE (ATSC) 3.0 SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of data services including televised media, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). The term "service" as used herein is as defined in ATSC 3.0 to be a collection of media components presented to the user in aggregate; components can be of multiple media types. A service can be either continuous or intermittent. A service can be real time or non-real time, and a real time service can consist of a sequence of TV programs. ATSC 3.0 is designed to be flexible so that as technology evolves, advances can be readily incorporated without requiring a complete overhaul of any related technical standard. Present principles are directed to such advances as divulged below.

SUMMARY

Present principles are directed to obfuscating the start time and duration of ATSC 3.0 advertisements to frustrate receivers in employing ad-skipping strategies, which can be unfriendly to the business model of broadcasters.

As understood herein, ATSC 3.0 may provide television content using Dynamic Adaptive Streaming over HyperText Transfer Protocol (HTTP) (DASH), as described in the international standard ISO/IEC 23009-1, which specifies a Media Presentation Description (MPD). ATSC 3.0 specifies the use of two types of dynamic live MPDs to facilitate content that is being encoded and delivered in real time and, in addition, to allow the replacement of certain content with replacement content (RC) tailored to the particular user. The first type of dynamic live MPD uses a segment naming convention based on a segment template and with an incremental numbering scheme, which may or may not need to be continually updated as the content is played, and which requires a clock on the receiver that is synchronized to the broadcast in order to correctly deduce the number, and thus name, of the segment that is available and that resides at the so-called "live edge" of the encoded stream. The segment numbering template type of dynamic live MPD is appropriate for content that is delivered over-the-air (OTA) where the decoder's clock can be synchronized with the OTA broadcast clock and be maintained even in a standby state.

The second type of dynamic live MPD uses a segment time template to explicitly include in the segment names the presentation timestamp (PTS) of the start of the segment, as well as only listing the segments that are available on the receiver for playback. This is particularly appropriate for live Over-The-Top (OTT) delivered segments when no synchronized broadcast clock is available or where the live encoding of segments results in variable segment durations that are not known well in advance. The segment timeline is represented in the DASH MPD in the SegmentTimeline element. Unlike the indexing mode of segment number templates, the explicitly defined segments in dynamic live segment time templates must always be available to the receiver and as such the last segment in the list is known to be the live edge without any need for clock synchronization. As such, this second type of dynamic live MPD addresses the challenge where the receiver clock may not be synchronized (or even synchronizable) with a broadcaster clock for technical reasons, particularly when segments in the stream are being delivered OTT with no precise synchronization to the clock in the broadcast channel. A receiver first tuning to a particular channel, by deriving the live edge simply from the information in the MPD, can immediately start playing from there.

Accordingly, in one aspect, a digital television system such as an Advanced Television Systems Committee (ATSC) 3.0 system includes at least one receiver of digital television content with segment timeline signaling. The broadcast stream is configured to use a SegmentTimeline based MPD that may include a Period of replaceable content but that does not, initially, include any information pertaining to the start time for when the content needs to be play, any indication of the duration of the content to be replaced, or any indication as to when the content will be replaced. ATSC 3.0 system provides for a broadcaster application (app) to be received and launched that, through mechanisms defined in ATSC 3.0, may be able to retrieve metadata in the stream, deliver the metadata to the app, with the metadata being typically obfuscated with a scheme known only to the app. The app may be able to interpret from the metadata what the start time and duration is, as well as knowing a suitable time to instruct the receiver to download and cache RC and a suitable time for the receiver to prepare the MPD Period that can playback the RC. Typically, this last step is just prior to the playback start time of RC.

In example implementations the instructions can be executable to receive the information in a Dynamic Adaptive Streaming over HyperText Transfer Protocol (HTTP) (DASH) Media Presentation Description (MPD) segment timeline data structure. The information pertaining to the RC can be received in an early available period (EAP) as described in ISO/IEC 23009-1 (DASH) containing only extensible markup language (XML) linking language (XLink) metadata and no content, content duration and/or the start time. In such a case, a computer network may be utilized by the broadcaster app to interpret the metadata to receive the start time and content duration necessary to replace the content at a future time.

Alternatively, the information pertaining to the RC can be received in an early available period (EAP) containing only an XLink and no content and containing the start time and/or content length in a form that only the broadcaster app can read. In such a case, the instructions can be executable to receive the start time and content duration in unencrypted form from the broadcaster app at a receiver app to configure the receiver app to play the RC at the start time.

Yet again, the instructions may be executable to receive indication of the start time and/or content durationi in an eventstream notification contained in a DASH period prior to the EAP containing the XLink.

In some examples, plural early available periods (EAP) each with an XLink being associated with a respective duration of content to be replaced. Responsive to receiving the indication of the start time, the instructions can be executable to select the EAP with XLink associated with a duration of the RC.

In another aspect, a digital television system includes at least one source of broadcast digital television content and at least one processor configured with instructions that are executable to send, to at least one receiver, information in a Dynamic Adaptive Streaming over HyperText Transfer Protocol (HTTP) (DASH) Media Presentation Description (MPD) segment timeline data structure. The information pertains to replacement content (RC) and does not include a start time for playing the RC and/or duration of the content to be replaced, or includes the start time and/or duration in a form that only a broadcast application (app) provided by a digital television broadcaster can read, such that the receiver can use the information to prepare insertion of the RC and play the RC by receiving, after preparing insertion of the RC, indication of the start time. The digital television logic can choose replaceable content itself (client-side content replacement) or allow the broadcaster application to choose (server-side content replacement).

In another aspect, in a digital television system, a method includes receiving information pertaining to replacement content (RC) which does not include a start time for playing the RC or a duration of the content to be replaced, or which includes the start time and duration in a form that only a broadcast application (app) provided by a digital television broadcaster can read. The method includes using the information to prepare insertion of the RC, and after receiving the information pertaining to the RC, receiving unencrypted indication of the start time. At the start time, the RC is played.

The details of the present application, both as to its structure and operation, can best be understood in reference to the accompanying drawings, in which like reference numerals refer to like parts, and in which:

DETAILED DESCRIPTION

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including televisions (e.g. smart TVs, Internet-enabled TVs), personal computers such as laptops and tablet computers, and mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
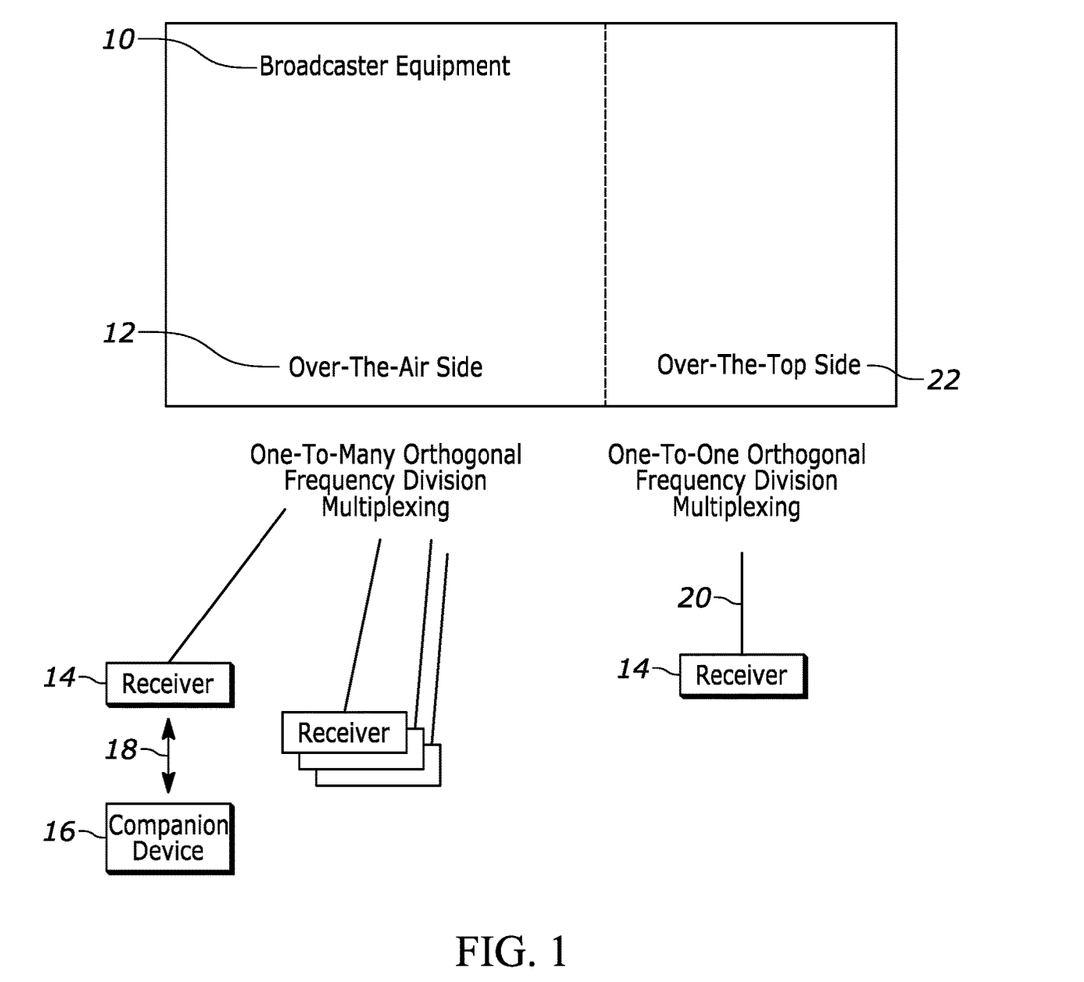
FIG. 1 is a block diagram of an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television service and may also receive related content, including television, via the OTT (broadband) path. Note that computerized devices described in all of the figures herein may include some or all of the components set forth for various devices in FIGS. 1 and 2.

Figure 2:
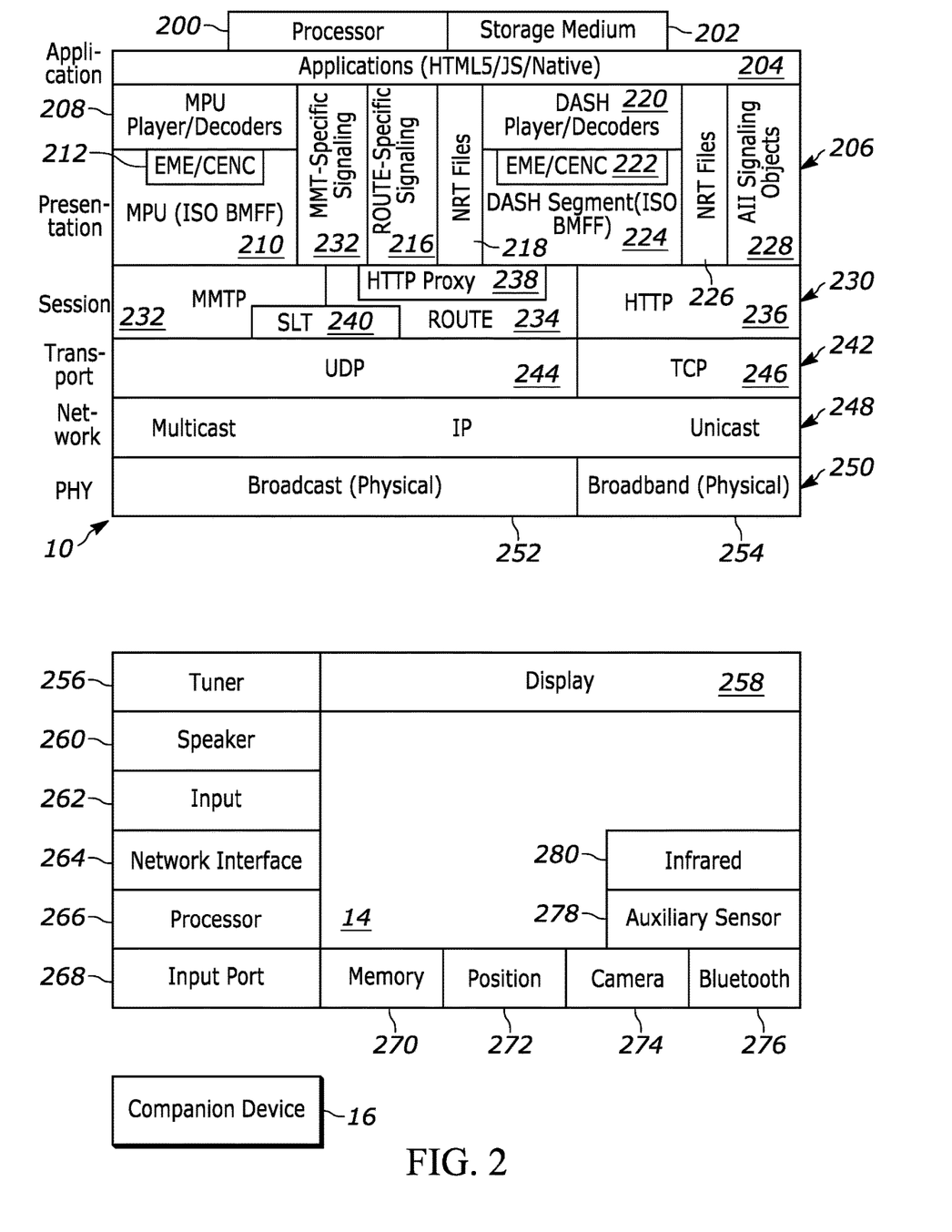
FIG. 2 is a block diagram showing components of the devices shown in FIG. 1.

Referring now to FIG. 2, details of the components shown in FIG. 1 may be seen. FIG. 2 illustrates a protocol stack that may be implemented by a combination of hardware and software. As discussed below, using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts machine access code (MAC) format to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box providing an audiovisual display to a TV monitor) 256. The software architecture in receiver 14 may be based on the Android® operating system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is/are configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
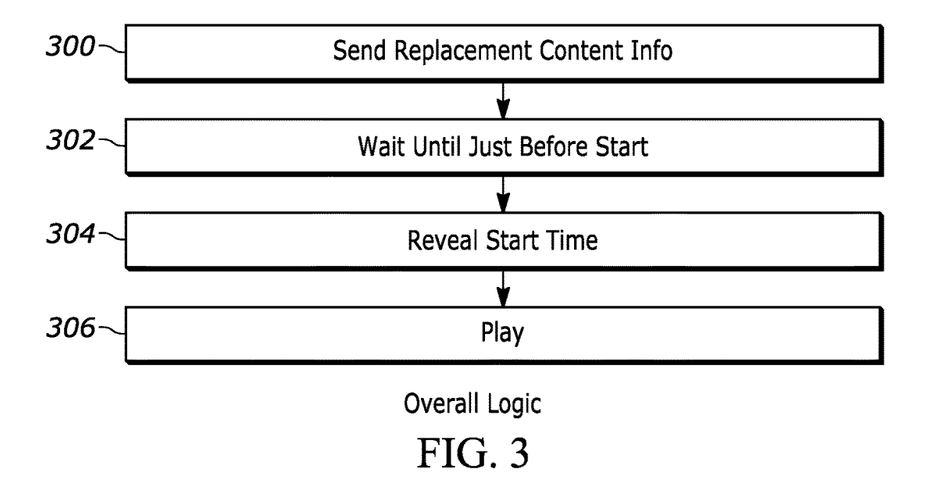
FIG. 3 illustrates example overall logic in example flow chart format.

Prior to turning to FIG. 3, in ATSC 3.0, MPEG DASH is used to send AV content and this content may contain replacement content (RC) such as advertisements or content intended for user personalized replacement. Multi periods with XLink tags are used by ATSC 3.0 (as discussed in ATSC A/344) to signal the location of such RC. As understood herein however, this may give advance notice of the location of RC that could be skipped easily by clients, which is unfriendly to a broadcaster's business model. Present principles can leverage the SegmentTimeline element of MPEG DASH MPD, which delivers just in time (JIT) information in the DASH manifest file (the MPD is updated with each additional segment). JIT information prevents advanced knowledge of a new period until the very last moment and eliminates trivial RC replacement strategies by "bad" receivers. Understanding that XLinks are early notifications that tell a broadcaster application (an application supplied from the broadcaster and that runs on the client receiver's HTML5 service), that the application will need to call the client receiver to cache the content and prepare to replace existing content. Since the XLink is attached to the period to be replaced, the advanced knowledge of the XLink, if it contained RC start time and/or duration of content to be replaced in the clear, could allow for skipping.

To resolve this, as set forth further below, the XLink can be sent in an early period that has no start time. In DASH this is known as an Early Available Period (EAP), see ISO/IEC 23009-1. The EAP is allowed to have metadata in the Period tag but no start time or duration of content to be replaced, or at least no start time or duration in the clear, i.e., in unencrypted form or unobfuscated form. Thus, using segmenttimeline, the start time of an EAP only needs to be revealed JIT (with a recent MPD update) resulting in insufficient time for implementing a strategy to skip RC. The XLink itself can be revealed at any time using the EAP to allow preparation time for content replacement.

Turn now to FIG. 3. Commencing at block 300, information pertaining to replacement content (RC) such as a replacement ad tailored to the particular user of a particular receiver is sent from the broadcaster well ahead of time for receivers to store. This replacement content may also be made available well ahead of time for receivers to fetch (in cached ad replacement systems). In example embodiments this information may include an XLink. The information does not include the start time of the RC and duration of content to be replaced, however, or at least it does not include an unencrypted or unobfuscated version of the start time.

Moving to block 302, a wait period (or trigger from a program guide or broadcast studio equipment) is entered such that just prior to the start time of the RC, the start time is revealed at block 304 to components of the receiver apart from the broadcaster app. In general the start time is revealed some time after the information pertaining to the RC is revealed, and may be revealed only a few milliseconds or a few seconds prior to the start time, so that a compromised receiver has insufficient time to execute a skip strategy. The start time and/or duration of content to be replaced may be revealed by sending the start time/duration to the receiver out-of-band or by other techniques described herein, or the start time/duration may be revealed by means of the broadcaster app receiving an encrypted or otherwise obfuscated form of the start time/duration along with the XLink and simply not providing an in-the-clear indication of the start time/duration to the rest of the receiver's components until just prior to the start time.

Figure 4:
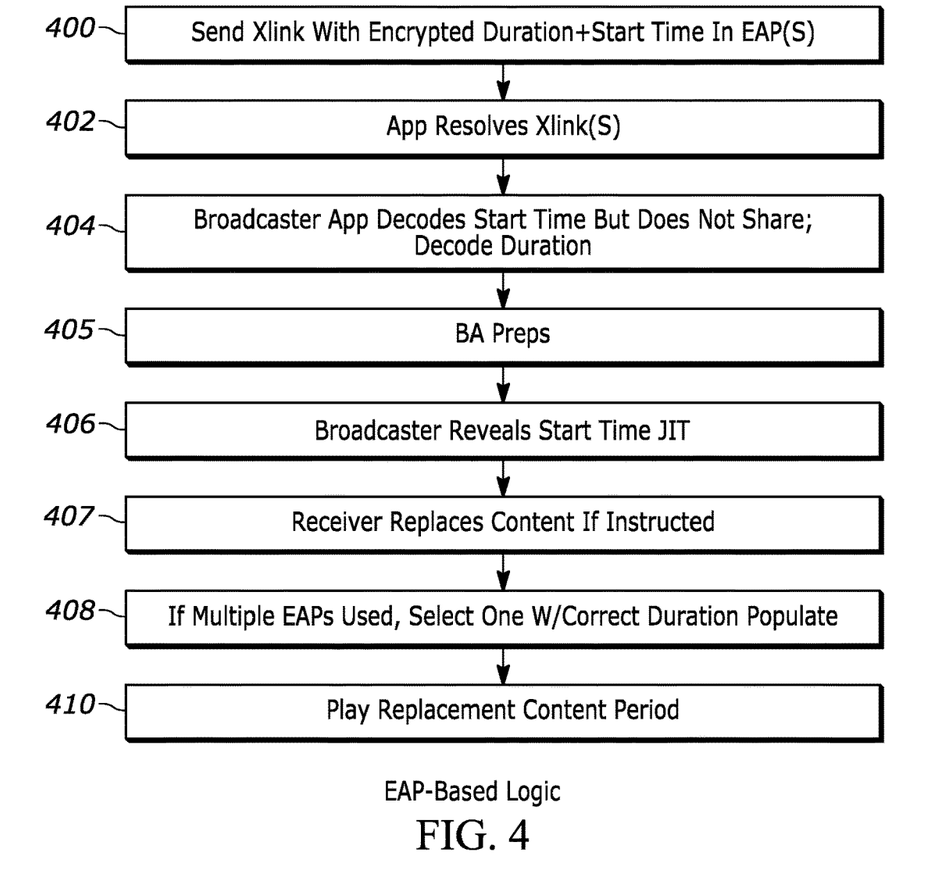
FIG. 4 illustrates example early available period (EAP)-based logic in example flow chart format.

FIG. 4 illustrates a specific technique. Commencing at block 400, one or more EAPs are sent with respective XLinks with an encrypted start time and also if desired an encrypted duration of content to be replaced. The XLink, but not the start time/duration, is provided to necessary components to permit the receiver to resolve the XLink at block 402 to prepare for RC insertion. The broadcaster app may decode the start time at block 404 but does not share it with other components of the receiver. At block 405 the broadcaster app may prepare the content replacement by instructing the receiver to cache content OTA or fetch and cache from OTT, else make the content available from an OTT server without caching, and then passing the instruction to replace this period containing the XLink at the appropriate time. At block 406 the broadcaster reveals the start time of the RC to the receiver in the EAP, which then becomes the new Period being played. At block 407, the receiver replaces the period with the RC period if previously instructed to do so.

Block 408 indicates that plural EAPs may be used, where each EAP has its own duration that is known only to the broadcaster app by decoding the XLinks. In other words, plural EAPs can be signaled in the DASH manifest file with each EAP having its own XLink and each allowing for caching of different types or durations of RC such that, depending on the content that eventually needs to be replaced, the broadcaster can select JIT which of the EAPs it would populate with subsequent over the air AV segments. If this selection matches one of the xlink notified cached replacement content the receiver will then replace it at this time.

Block 410 indicates that the RC Period, whether the original or replacement, is played at the start time by the receiver.

Figure 5:
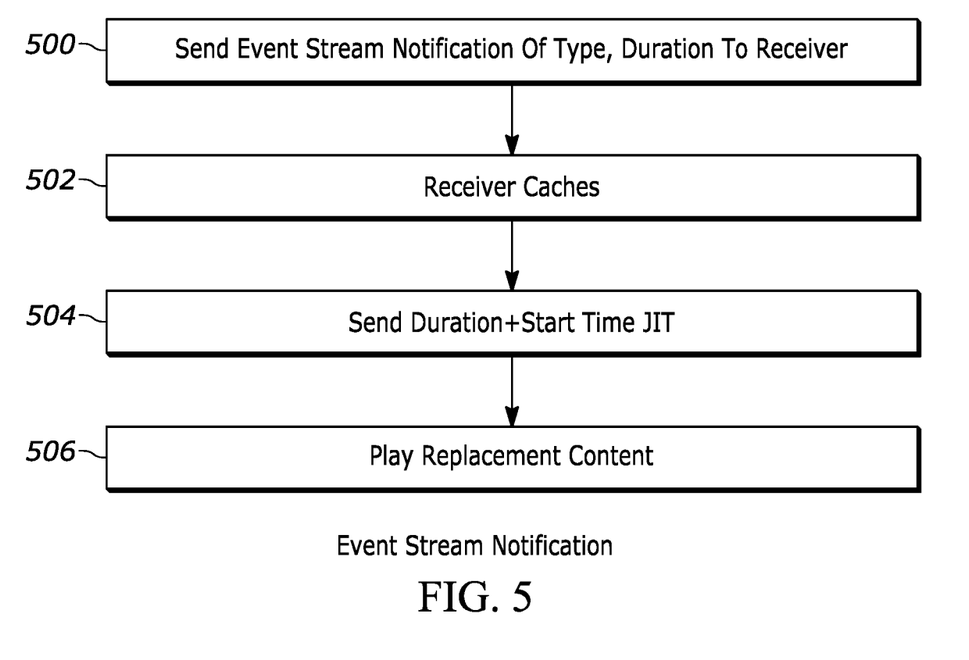
FIG. 5 illustrates example eventstream-based logic in example flow chart format.

FIG. 5 illustrate an alternate technique. Some or all of the RC information, including type duration and an indication of start time, is carried in an eventstream notification and sent to the receiver. Details of a DASH eventstream notification may be found in ATSC A/344. The eventstream notification is added to the current played period to signal (using ATSC 3.0 signaling methods) to the broadcaster app of the type and duration of the replaceable content that is soon to appear. The broadcaster app is notified of this information and can then cache the RC at block 502. The client receiver does not know when the replacement start time will happen until JIT at block 504 to permit playing the RC at the start time at block 506.

Figure 6:
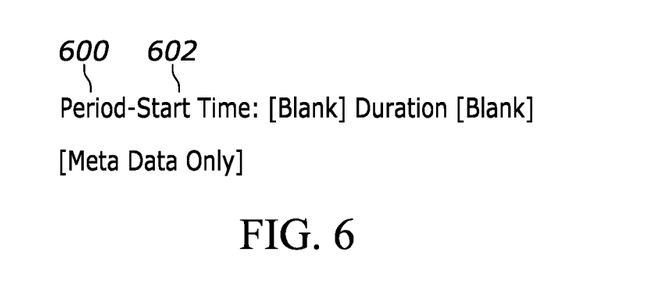
FIG. 6 illustrates an example portion of a DASH manifest file in which RC start time is left blank.

FIG. 6 illustrates a segment timeline period 600 with a start time 602 having no data. The period 600 contains metadata only such as an XLink and no content. The period 600 also may omit the duration of content to be replaced.

Figure 7:
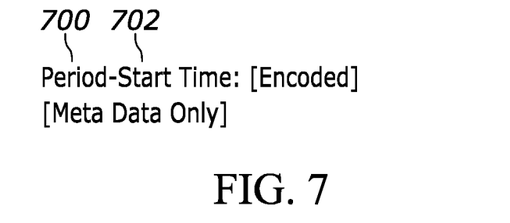
FIG. 7 illustrates an example portion of a DASH manifest file in which RC start time is encrypted so that only the broadcaster app can decode and read it.

FIG. 7 on the other hand illustrates a segment timeline period 700 with an encrypted start time 702. The period 700 contains metadata only such as an XLink and no content. The period 700 may also include in encrypted form the duration of content to be replaced.

Segmenttimeline is ideal for obscuring content because the DASH manifest needs refreshing continuously and at the right moment. This places a heavy burden on client receivers to record and replay, a technique that also allows for pause of live TV. Pause and record is a way a client could allow more advanced knowledge of content but segmenttimeline makes this a heavy burden.

Techniques herein may be implemented through ATSC 3.0 and perhaps DASH IOP. Client implementation may require that client receivers support the EAP from the MPEG DASH main standard in segment timeline mode.

A more detailed multi-period segment timeline DASH manifest file is set forth below with an EAP shown that contains an xlink metadata that is intended to be interpretable only by the broadcaster app. The receiver is expected to notify the broadcaster app of this xlink upon the xlink's first wherein the broadcaster app then decides what to do, cache OTT, cache OTA, prepare for live OTT replacement or not replace at all. The broadcaster app then instructs the receiver to perform cache actions and prepare for period replacement as needed:

```xml
<?xml version="1.0" encoding="UTF-8"?>
<MPD xmlns="urn:mpeg:dash:schema:mpd:2011"
xmlns:xlink="http://www.w3.org/1999/xlink" availabilityStartTime="2022-05-
27T01:06:38.197Z" id="urn:atsc: 21 nload 21 t:xxx/12/50" minBufferTime="PT2.000000S"
minimumUpdatePeriod="PT0S" profiles="urn:mpeg:dash:profile:isoff-
broadcast:2015,http://dashif.org/guidelines/dash-atsc-main,urn:mpeg:dash:profile:isoff-
live:2011" publishTime="2022-05-27T01:06:38Z" suggestedPresentationDelay="PT1.500S"
timeShiftBufferDepth="PT60.0S" type="dynamic">
    <Period id="p12" start="PT164H29M43S">
      <AdaptationSet contentType="video" segmentAlignment="true" startWithSAP="1">
        <Representation bandwidth="3364000" codecs="hev1" 21 nload 21 te="30" height="1080"
id="100" mimeType="video/mp4" width="1920"/>
          <SegmentTemplate  initialization="SEGMENT$RepresentationID$_init.mp4"
media="SEGMENT$RepresentationID$_$Time$.m4s"
presentationTimeOffset="142123920000" timescale="240000">
          <SegmentTimeline>
            <S d="480000" t="143371680000"/>
            <S d="480000" t="143372160000"/>
            <S d="480000" t="143372640000"/>
            <S d="480000" t="143373120000"/>
          </SegmentTimeline>
        </SegmentTemplate>
    </AdaptationSet>
    <AdaptationSet contentType="audio" lang="en" segmentAlignment="true"
startWithSAP="1">
      <Role schemeIdUri="urn:mpeg:dash:role" value="main"/>
      <Representation audioSamplingRate="48000" bandwidth="48000" codecs="ac-4.02.01.00"
id="200" mimeType="audio/mp4">
        <AudioChannelConfiguration
schemeIdUri="tag:dolby.com,2015:dash:audio_channel_configuration:2015" value="000001"/>
      </Representation>
      <SegmentTemplate initialization="SEGMENT$RepresentationID$_init.mp4"
media="SEGMENT$RepresentationID$_$Time$.m4s"
presentationTimeOffset="142123920000" timescale="240000">
        <SegmentTimeline>
          <S d="481280" t="143371868160"/>
          <S d="481280" t="143372349440"/>
          <S d="481280" t="143372830720"/>
          <S d="481280" t="143373312000"/>
        </SegmentTimeline>
      </SegmentTemplate>
      <Label id="0" lang="English-1" value="aTextLabel"/>
    </AdaptationSet>
  </Period>
  <Period id="p13" xlink:actuate="22nload" xlink:href="tag:atsc.org,2016:xlinkfoo"/>
</MPD>
```

40

A multi-period dynamic MPD is now set forth where the EAP is replaced by an non empty Period containing the latest segment being delivered OTA along the the start time of this period. A receiver may have been instructed by the broadcaster app to replace this period with a alternative period for the replaced content. A receiver that is not instructed to replace the Period will continue playback into this period as normal. Whilst the second period is being populated with the latest 'live' segments older segments disappear from first period. Having been told about the xLink for RC in the past and having been instructed previously to replace this period and now that the receiver sees the start tme within the period being used to play the replaceable content, the MPD will be edited on the receiver to ensure the replaced content is played instead of the segments being delivered OTA. In third MPD herein, another multi-period with period id p14 becomes the new period which broadcaster starts populating. Period ids p13 and p14 have start times, and the difference between them defines duration of p13 which should exactly match the replaced content for seamless playback. To ensure this match, the duration may be have been encoded in the xLink to interpreted by the broadcaster app, or the broadcaster app may contact an OTT server to obtain the duration:

```xml
<?xml version="1.0" encoding="UTF-8"?>
<MPD xmlns="urn:mpeg:dash:schema:mpd:2011" xmlns:xlink="http://www.w3.org/1999/xlink"
availabilityStartTime="2022-05-27T01:06:38.197Z" id="urn:atsc:serviceid:xxx/12/50"
minBufferTime="PT2.000000S" minimumUpdatePeriod="PT0S"
profiles="urn:mpeg:dash:profile:isoff-broadcast:2015,http://dashif.org/guidelines/dash-atsc-
main,urn:mpeg:dash:profile:isoff-live:2011" publishTime="2022-05-27T01:06:38Z"
suggestedPresentationDelay="PT1.500S" timeShiftBufferDepth="PT60.0S" type="dynamic">
    <Period id="p12" start="PT164H29M43S">
      <AdaptationSet contentType="video" segmentAlignment="true" startWithSAP="1">
        <Representation bandwidth="3364000" codecs="hev1" frameRate="30" height="1080"
id="100" mimeType="video/mp4" width="1920"/>
          <SegmentTemplate initialization="SEGMENT$RepresentationID$_init.mp4"
media="SEGMENT$RepresentationID$_$Time$.m4s"
presentationTimeOffset="142123920000" timescale="240000">
```

```xml
        <SegmentTimeline>
           <S d="480000" t="143380320000"/>
           <S d="480000" t="143380800000"/>
           <S d="480000" t="143381280000"/>
        </SegmentTimeline>
      </SegmentTemplate>
    </AdaptationSet>
    <AdaptationSet contentType="audio" lang="en" segmentAlignment="true" startWithSAP="1">
      <Role schemeIdUri="urn:mpeg:dash:role" value="main"/>
      <Representation audioSamplingRate="48000" bandwidth="48000" codecs="ac-4.02.01.00" id="200" mimeType="audio/mp4">
        <AudioChannelConfiguration schemeIdUri="tag:dolby.com,2015:dash:audio_channel_configuration:2015" value="000001"/>
      </Representation>
      <SegmentTemplate initialization="SEGMENT$RepresentationID$_init.mp4" media="SEGMENT$RepresentationID$_$Time$.m4s" presentationTimeOffset="142123920000" timescale="240000">
        <SegmentTimeline>
           <S d="481280" t="143380531200"/>
           <S d="481280" t="143381012480"/>
           <S d="481280" t="143381493760"/>
        </SegmentTimeline>
      </SegmentTemplate>
      <Label id="0" lang="English-1" value="aTextLabel"/>
    </AdaptationSet>
  </Period>
  <Period id="p13" start="PT165H57M4S" xlink:actuate="onLoad" xlink:href="tag:atsc.org,2016:xlinkfoo">
    <AdaptationSet contentType="video" segmentAlignment="true" startWithSAP="1">
      <Representation bandwidth="3364000" codecs="hev1" frameRate="30" height="1080" id="100" mimeType="video/mp4" width="1920"/>
      <SegmentTemplate initialization="SEGMENT$RepresentationID$_init.mp4" media="SEGMENT$RepresentationID$_$Time$.m4s" presentationTimeOffset="143381760000" timescale="240000">
        <SegmentTimeline>
           <S d="480000" t="143381760000"/>
        </SegmentTimeline>
      </SegmentTemplate>
    </AdaptationSet>
    <AdaptationSet contentType="audio" lang="en" segmentAlignment="true" startWithSAP="1">
      <Role schemeIdUri="urn:mpeg:dash:role" value="main"/>
      <Representation audioSamplingRate="48000" bandwidth="48000" codecs="ac-4.02.01.00" id="200" mimeType="audio/mp4">
        <AudioChannelConfiguration schemeIdUri="tag:dolby.com,2015:dash:audio_channel_configuration:2015" value="000001"/>
      </Representation>
      <SegmentTemplate initialization="SEGMENT$RepresentationID$_init.mp4" media="SEGMENT$RepresentationID$_$Time$.m4s" presentationTimeOffset="143381760000" timescale="240000">
        <SegmentTimeline>
           <S d="481280" t="143381975040"/>
        </SegmentTimeline>
      </SegmentTemplate>
      <Label id="0" lang="English-1" value="aTextLabel"/>
    </AdaptationSet>
  </Period>
</MPD>
```

Period containing the replaceable content has passed and a new non replaceable Period appears at the live point:

```xml
<?xml version="1.0" encoding="UTF-8"?>
<MPD xmlns="urn:mpeg:dash:schema:mpd:2011" xmlns:xlink="http://www.w3.org/1999/xlink" availabilityStartTime="2022-05-27T01:06:38.197Z" id="urn:atsc:serviceid: xxx/12/50" minBufferTime="PT2.000000S" minimumUpdatePeriod="PT0S" profiles="urn:mpeg:dash:profile:isoff-broadcast:2015,http://dashif.org/guidelines/dash-atsc-main, urn:mpeg:dash:profile:isoff-live:2011" publishTime="2022-05-27T01:06:38Z" suggestedPresentationDelay="PT1.500S" timeShiftBufferDepth="PT60.0S" type="dynamic">
  <Period id="p13" start="PT165H57M4S" xlink:actuate="onLoad" xlink:href="tag:atsc.org,2016:xlinkfoo">
    <AdaptationSet contentType="video" segmentAlignment="true" startWithSAP="1">
      <Representation bandwidth="3364000" codecs="hev1" frameRate="30" height="1080" id="100" mimeType="video/mp4" width="1920"/>
```

-continued

```
    <SegmentTemplate          initialization="SEGMENT$RepresentationID$_init.mp4"
media="SEGMENT$RepresentationID$_$Time$.m4s"
presentationTimeOffset="143381760000" timescale="240000">
        <SegmentTimeline>
           <S d="480000" t="143388480000"/>
        </SegmentTimeline>
           </SegmentTemplate>
    </AdaptationSet>
    <AdaptationSet       contentType="audio"      lang="en"      segmentAlignment="true"
start WithSAP="1">
       <Role schemeIdUri="urn:mpeg:dash:role" value="main"/>
       <Representation audioSamplingRate="48000" bandwidth="48000" codecs="ac-
4.02.01.00" id="200" mimeType="audio/mp4">
          <AudioChannelConfiguration
schemeIdUri="tag:dolby.com,2015:dash:audio_channel_configuration:2015" value="000001"/>
       </Representation>
       <SegmentTemplate          initialization="SEGMENT$RepresentationID$_init.mp4"
media="SEGMENT$RepresentationID$_$Time$.m4s"
presentationTimeOffset="143381760000" timescale="240000">
        <SegmentTimeline>
           <S d="481280" t="143388712960"/>
        </SegmentTimeline>
       </SegmentTemplate>
       <Label id="0" lang="English-1" value="aTextLabel"/>
    </AdaptationSet>
 </Period>
 <Period id="p14" start="PT165H57M34S">
    <AdaptationSet contentType="video" segmentAlignment="true" startWithSAP="1">
       <Representationbandwidth="3364000"      codecs="hev1"      frameRate="30"
height="1080" id="100" mimeType="video/mp4" width="1920"/>
       <SegmentTemplate          initialization="SEGMENT$RepresentationID$_init.mp4"
media="SEGMENT$RepresentationID$_$Time$.m4s"
presentationTimeOffset="143388960000" timescale="240000">
        <SegmentTimeline>
           <S d="480000" t="143388960000"/>
           <S d="480000" t="143389440000"/>
           <S d="480000" t="143389920000"/>
        </SegmentTimeline>
       </SegmentTemplate>
    </AdaptationSet>
    <AdaptationSet       contentType="audio"      lang="en"      segmentAlignment="true"
startWithSAP="1">
       <Role schemeIdUri="urn:mpeg:dash:role" value="main"/>
       <Representation audioSamplingRate="48000" bandwidth="48000" codecs="ac-
4.02.01.00" id="200" mimeType="audio/mp4">
          <AudioChannelConfiguration
schemeIdUri="tag:dolby.com,2015:dash:audio_channel_configuration:2015" value="000001"/>
       </Representation>
       <SegmentTemplate          initialization="SEGMENT$RepresentationID$_init.mp4"
media="SEGMENT$RepresentationID$_$Time$.m4s"
presentationTimeOffset="143388960000" timescale="240000">
        <SegmentTimeline>
           <S d="481280" t="143389194240"/>
           <S d="481280" t="143389675520"/>
           <S d="481280" t="143390156800"/>
        </SegmentTimeline>
       </SegmentTemplate>
       <Label id="0" lang="English-1" value="aTextLabel"/>
    </AdaptationSet>
 </Period>
</MPD>
```

It will be appreciated that whilst present principals have been described with reference to some example embodiments, these are not intended to be limiting, and that various alternative arrangements may be used to implement the subject matter claimed herein.

What is claimed is:

1. A digital television system comprising:
   at least one receiver of digital television content with segment timeline signaling, the receiver being programmed with instructions to configure the receiver to:
   receive information pertaining to replacement content (RC) which does not include a start time for playing the RC, or which includes the start time in a form that only a broadcast application (app) provided by a digital television broadcaster can read;
   just prior to the start time, receive indication of the start time; and
   at the start time, play the RC.

2. The system of claim 1, wherein the instructions are executable to:
   receive the information in a Dynamic Adaptive Streaming over HyperText Transfer Protocol (HTTP) (DASH) Media Presentation Description (MPD) segment timeline time-based data structure.

3. The system of claim 2, wherein the information is received in an early available period (EAP) containing only metadata and no content or the start time or duration of content to be replaced.

4. The system of claim 3, wherein the instructions are executable to receive an indication of the start time from a computer network.

5. The system of claim 2, wherein the information is received in an early available period (EAP) containing only metadata and no content and containing an indication of the start time in a form that only the broadcaster app can read.

6. The system of claim 5, wherein the instructions are executable to receive at least an indication of the start time in unencrypted form from the broadcaster app at a receiver app to configure the receiver app to play the RC at the start time.

7. The system of claim 1, wherein the instructions are executable to receive indication of the start time in an eventstream notification contained in a DASH period.

8. The system of claim 2, wherein the instructions are executable to:
receive plural early available periods (EAP) each associated with a respective extensible markup language (XML) linking language (XLink), each XLink being associated with a respective duration; and
select the EAP with XLink associated with a duration of the RC.

9. A digital television system comprising:
at least one source of broadcast digital television content; and
at least one processor configured with instructions that are executable to:
send, to at least one receiver, information in a Dynamic Adaptive Streaming over HyperText Transfer Protocol (HTTP) (DASH) Media Presentation Description (MPD) segment timeline time-based data structure, the information pertaining to replacement content (RC) which does not include a start time for playing the RC, or which includes the start time in a form that only a broadcast application (app) provided by a digital television broadcaster can read, such that the receiver can use the information to prepare insertion of the RC and play the RC by receiving, after preparing insertion of the RC, indication of the start time.

10. The digital television system of claim 9, wherein the information is sent in an early available period (EAP) containing only metadata and no content or the start time.

11. The digital television system of claim 10, wherein the instructions are executable to send indication of the start time to the receiver using a computer network.

12. The digital television system of claim 9, wherein the information is sent in an early available period (EAP) containing only metadata and no content and containing the start time in a form that only a broadcaster app in the receiver can read.

13. The digital television system of claim 9, wherein the instructions are executable to send indication of the start time in an eventstream notification contained in a DASH period.

14. The digital television system of claim 9, wherein the instructions are executable to:
send to the receiver plural early available periods (EAP) each associated with a respective extensible markup language (XML) link (XLink), each XLink being associated with a respective duration; and
send to the receiver indication of length to enable the receiver to select the EAP with XLink associated with a duration of the RC.

15. In a digital television system, a method comprising:
receiving information pertaining to replacement content (RC) which does not include a start time for playing the RC, or which includes the start time in a form that only a broadcast application (app) provided by a digital television broadcaster can read;
after receiving the information pertaining to the RC, receiving the start time; and
at the start time, playing the RC.

16. The method of claim 15, comprising:
receiving the information in a Dynamic Adaptive Streaming over HyperText Transfer Protocol (HTTP) (DASH) Media Presentation Description (MPD) segment timeline time-based data structure.

17. The method of claim 16, comprising receiving the information in an early available period (EAP) containing only metadata and no content or indication of the start time.

18. The method of claim 17, comprising receiving indication of the start time from a computer network.

19. The method of claim 16, comprising receiving the information in an early available period (EAP) containing only metadata and no content and containing the start time in a form that only the broadcaster app can read, and receiving the start time in unencrypted form from the broadcaster app at a receiver app to configure the receiver app to play the RC at the start time.

20. The method of claim 16, comprising receiving indication of the start time in an eventstream notification contained in a DASH period.

* * * * *